United States Patent
Lim et al.

(10) Patent No.: US 11,062,162 B2
(45) Date of Patent: Jul. 13, 2021

(54) BREAKING PURSUIT AND STRATEGY CHANGE

(71) Applicant: MOTOROLA SOLUTIONS, INC., Chicago, IL (US)

(72) Inventors: Bing Qin Lim, Penang (MY); Chun Meng Tan, Penang (MY); Choon Kang Wong, Perak (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 162 days.

(21) Appl. No.: 16/552,816

(22) Filed: Aug. 27, 2019

(65) Prior Publication Data
US 2021/0064903 A1 Mar. 4, 2021

(51) Int. Cl.
*G06K 9/20* (2006.01)

(52) U.S. Cl.
CPC ....... *G06K 9/2063* (2013.01); *G06K 2209/21* (2013.01)

(58) Field of Classification Search
None
See application file for complete search history.

(56) References Cited

U.S. PATENT DOCUMENTS

| | | | | |
|---|---|---|---|---|
| 2003/0158960 | A1* | 8/2003 | Engberg | G06Q 20/02 709/237 |
| 2015/0281653 | A1* | 10/2015 | Frangiadakis | G06K 9/00785 348/159 |
| 2016/0358080 | A1 | 12/2016 | Blanco et al. | |
| 2017/0124505 | A1 | 5/2017 | Nakfour et al. | |
| 2018/0033109 | A1* | 2/2018 | Fund | G01C 21/3484 |
| 2019/0042896 | A1 | 2/2019 | Sabripour | |

FOREIGN PATENT DOCUMENTS

WO 2020204735 A1 10/2020

* cited by examiner

*Primary Examiner* — Sumati Lefkowitz
*Assistant Examiner* — Dalen O Goodson
(74) *Attorney, Agent, or Firm* — Michael Best and Friedrich LLP

(57) ABSTRACT

Methods and systems of breaking pursuit of a target. One example embodiment includes an electronic processor configured to develop a first identifier for the target and determine a breaking junction and an intercept point associated with a cornering route. The processor is configured to determine a geographical area associated with at least one possible target flee route for the target and determine a second identifier for an object within the geographical area. The processor is configured to develop a discrimination factor representing a degree of differentiation of the first identifier from the second identifier. The processor is configured to predict whether the discrimination factor will exceed a threshold when the pursuit asset arrives at the breaking junction. The processor is configured to, in response to the discrimination factor exceeding the threshold, notify the pursuit asset to break pursuit of the target at the breaking junction to execute the cornering route.

20 Claims, 12 Drawing Sheets

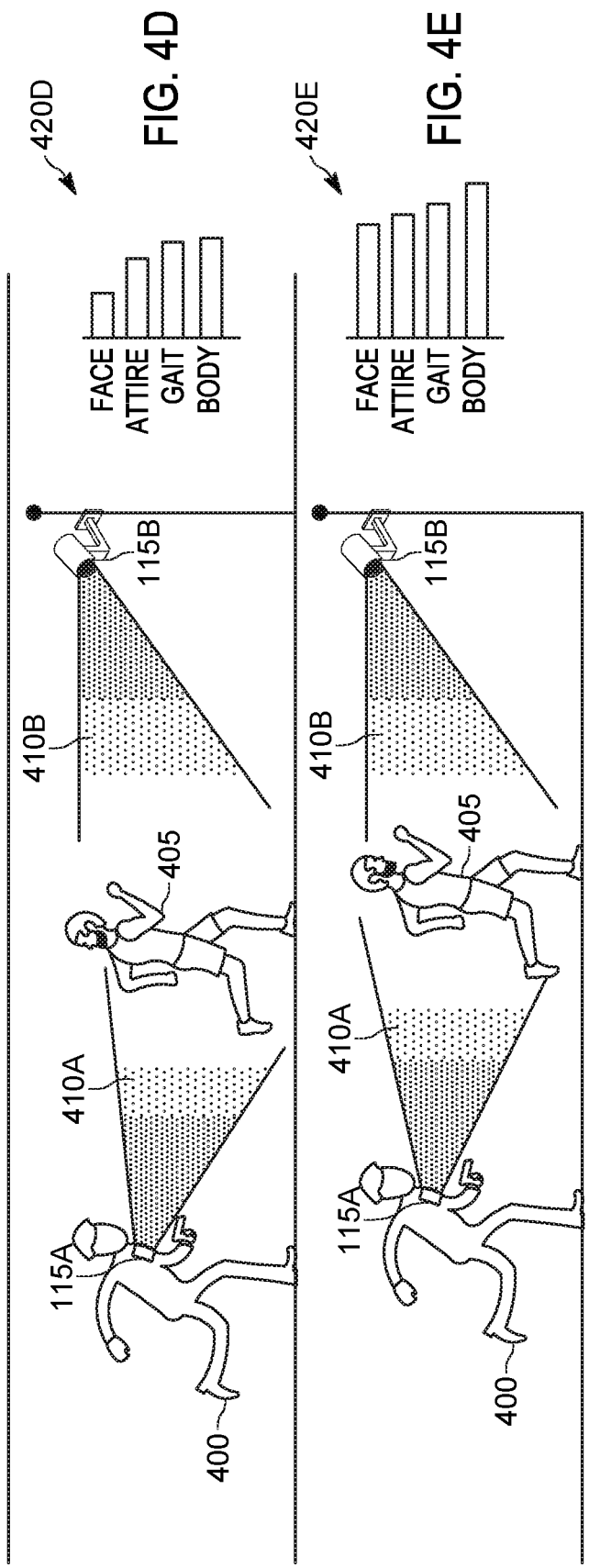

| TARGET | |
|---|---|
| FACE | N/A |
| BODY | 172m HEIGHT |
| | HEAVY |
| GAIT | [RUNNING PATTERN] |
| ATTIRE | BACK VIEW |
| | YELLOW SHIRT |
| | BLUE PANT |

FIG. 6A

| FIRST BYSTANDER | |
|---|---|
| FACE | FACE SHAPE |
| BODY | 173m HEIGHT |
| | HEAVY |
| GAIT | [WALKING PATTERN] |
| ATTIRE | FRONT VIEW |
| | YELLOW SHIRT |

FIG. 6B

| SECOND BYSTANDER | |
|---|---|
| FACE | FACE SHAPE |
| BODY | 170m HEIGHT |
| | HEAVY |
| GAIT | [RUNNING PATTERN] |
| ATTIRE | FRONT VIEW |
| | YELLOW SHIRT |
| | BLUE PANT |

FIG. 6C

FIG. 7A — TARGET
- FACE
- LEFT PARTIAL FACE
- SHORT HAIR
- BODY
- 172m HEIGHT
- HEAVY
- GAIT
- [RUNNING PATTERN]
- ATTIRE
- BACK VIEW
- YELLOW SHIRT
- LONG SLEEVE
- BLUE PANT
- LONG PANT

FIG. 6E — FOURTH BYSTANDER
- FACE
- N/A
- BODY
- 190m HEIGHT
- THIN
- GAIT
- [RUNNING PATTERN]
- ATTIRE
- BLUE SHIRT

FIG. 6D — THIRD BYSTANDER
- FACE
- N/A
- BODY
- 174m HEIGHT
- HEAVY
- GAIT
- [SITTING PATTERN]
- ATTIRE
- BACK VIEW
- YELLOW SHIRT

FIRST BYSTANDER

- FACE
- RIGHT PARTIAL FACE
- SHORT HAIR
- BODY
- 173m HEIGHT
- HEAVY
- GAIT
- [WALKING PATTERN]
- [RUNNING PATTERN]
- ATTIRE
- FRONT VIEW
- YELLOW SHIRT
- GREEN CAP

FIG. 7B

SECOND BYSTANDER

- FACE
- LEFT PARTIAL FACE
- BODY
- 170m HEIGHT
- HEAVY
- GAIT
- [RUNNING PATTERN]
- ATTIRE
- FRONT VIEW
- YELLOW SHIRT
- LONG SLEEVE
- BLUE PANT
- LONG PANT
- BRAND "A" SHOES

FIG. 7C

THIRD BYSTANDER

- FACE
- 80% FACE FEATURE
- BODY
- 174m HEIGHT
- HEAVY
- GAIT
- [SITTING PATTERN]
- ATTIRE
- BACK VIEW
- YELLOW SHIRT
- SHORT SLEEVE

FIG. 7D

| TARGET |
|---|
| FACE |
| 60% FACE FEATURE |
| LEFT VIEW 30% |
| SHORT HAIR |
| DYE HAIR BROWN |
| BODY |
| 172m HEIGHT |
| HEAVY |
| NO TATTOO ON LEG |
| GAIT |
| [RUNNING PATTERN] |
| ATTIRE |
| BACK VIEW |
| FRONT VIEW |
| YELLOW SHIRT |
| LONG SLEEVE |
| BRAND "B" LOGO ON SHIRT |
| BLUE PANT |
| LONG PANT |
| BRAND "B" SHOES |

FIG. 8A

| FIRST BYSTANDER |
|---|
| FACE |
| 90% FACE FEATURE |
| SHORT HAIR |
| BODY |
| 173m HEIGHT |
| HEAVY |
| TATTOO ON LEG |
| GAIT |
| [WALKING PATTERN] |
| [RUNNING PATTERN] |
| ATTIRE |
| FRONT VIEW |
| PLAIN SHIRT FRONT |
| YELLOW SHIRT |
| GREEN CAP |

FIG. 8B

| SECOND BYSTANDER |
|---|
| FACE |
| FACE VIEW 93% |
| BODY |
| 170m HEIGHT |
| HEAVY |
| GAIT |
| [RUNNING PATTERN] |
| ATTIRE |
| FRONT VIEW |
| YELLOW SHIRT |
| LONG SLEEVE |
| BLUE PANT |
| LONG PANT |
| BRAND "A" SHOES |

FIG. 8C

BREAKING PURSUIT AND STRATEGY CHANGE

BACKGROUND OF THE INVENTION

A target fleeing from a pursuit asset may be tracked (tagged) and pursued in a variety of ways. For example, a pursuit asset may follow a cornering route when pursuing a target. A cornering route is a route that allows a pursuit asset to get ahead of a target and cornering the target at an intercept point. In order to confidently identify (securely tag) the target at the intercept point, an identifier of the target is developed. The identifier is used to discriminate the target from another object along the path that the target is moving. However, when a pursuit asset breaks pursuit of the target to follow the cornering route, the identifier of the target may not be comprehensively developed enough to securely tag the target. In other words, the development of the identifier may not be at a developmental point where the target may be confidently differentiated from another object at the intercept point. When a target cannot be confidently differentiated along the path that the target is moving, another object may be mistakenly tagged as the target.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 4A-4E illustrate stages of a pursuit according to some embodiments.

FIGS. 6A-6E illustrate tables listing attributes after a first pursuit duration according to some embodiments.

FIGS. 7A-7D illustrate updated tables listing attributes after a second pursuit duration according to some embodiments.

FIGS. 8A-8C illustrate updated tables listing attributes after a third pursuit duration according to some embodiments.

Figure 1:
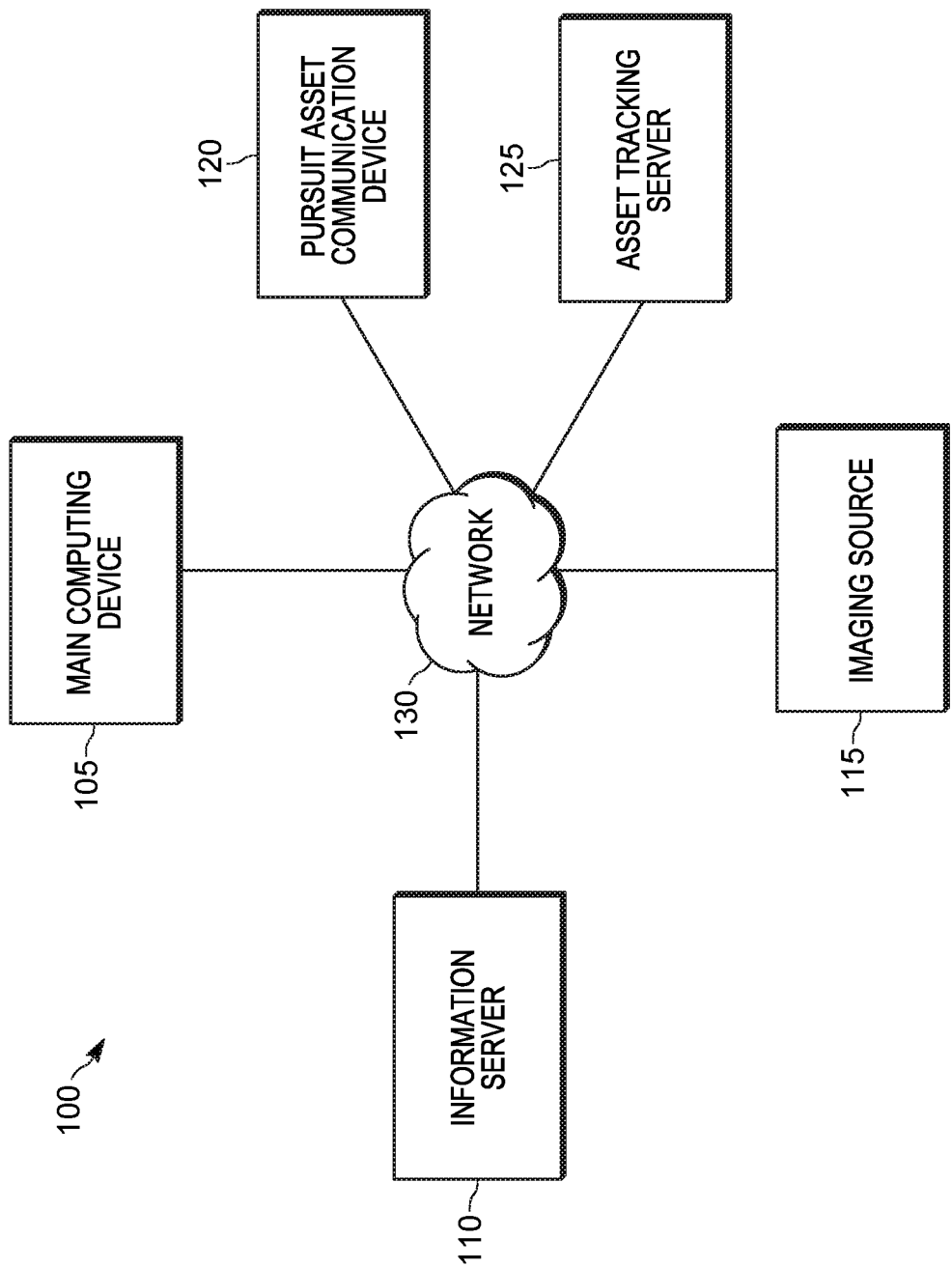
FIG. 1 is a block diagram of a communication system for pursuing a target according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When pursuing a target, a pursuit asset may follow a cornering route. A pursuit asset includes, for example, a law enforcement officer (for example, a police officer on foot, an undercover police officer, and the like), a law enforcement vehicle, such as a police cruiser (human-driven or autonomous vehicle), a police helicopter, an unmanned aerial vehicle (for example, a drone), and the like. A cornering route is a route that allows a pursuit asset to get ahead of a target and corner the target at an intercept point. In order to confidently identify (securely tag) the target along the moving path of the target, an identifier of the target is developed. The identifier of the target may be developed using, for example, imaging data. The identifier is used to securely tag and identify the target along the moving path of the target (for example, discriminate the target from another object along the moving path of the target). However, when a pursuit asset breaks pursuit of the target to follow the cornering route, the identifier of the target may not be comprehensively developed enough to securely tag the target. In other words, the development of the identifier may not be at a developmental point (or maturity) where the target may be confidently differentiated from another object along the moving path of the target. When a target cannot be confidently differentiated along the moving path of the target, another object along the moving path of the target or adjacent to the target may be mistakenly tagged as the target. For example, a bystander along the moving path of the target or at the intercept point may share similar attributes (for example, similar attire, similar facial features, similar gait features, similar body features, and the like) as the target. When a pursuit asset pre-maturely initiates a cornering route (before an identifier of the target is comprehensively developed), the bystander sharing similar attributes along the moving path of the target or at the intercept point may be mistakenly tagged as the target. After the pursuit asset breaks pursuit to follow a cornering route, the target may be out of view from the pursuit asset and, thus, any mistake from continued tracking of the target (for example, a closed-circuit television camera along the moving path of the target may mistakenly tag another object instead of the target) may cause detrimental effect to the pursuit. For example, the pursuit asset may lose the location of the target or continue the pursuit in a wrong direction or at a wrong location and, ultimately, fail to capture the target.

The maturity of an identifier generally depends on how long the identifier has been developed (a development time). The amount of imaging data collected during the development time depends on a length of the development time. Therefore, a longer development time allows for more imaging data to be collected and used in the development of the identifier. In other words, the longer the development time for an identifier, the stronger (or more mature) the identifier will be. A more mature identifier may result in a higher confidence level that the target will be differentiated from another object along the moving path of the target or at the intercept point. In other words, the more mature the identifier of the target is, the more likely that the target will be securely tagged and properly identified along the moving path of the target or at the intercept point.

A development time for an identifier may vary for a number of reasons. For example, a body-worn camera may be unable to capture a clear image in a short period of time (as a result of shakiness during a foot pursuit of the target due to pursuit motion during running) and may need to capture multiple images in order to capture a clear image. Alternatively or in addition, an imaging source may not have a front view of the target. Therefore, imaging data associated with a face of the target may not be available. For example, the target may not turn his/her face back towards a body-worn camera of a pursuit asset during pursuit, an imaging source may not be positioned ahead of the target, an imaging source positioned ahead of the target is not positioned close enough to collect sufficient imaging data associated with a front of the target, or the like.

Setting a constant wait time (for example, five minutes) before breaking pursuit to follow a cornering route may not be a viable solution. As an initial point, minimizing a duration of a pursuit is desirable. Additionally, as noted above, the development time for an identifier is variable based on a context of the pursuit (for example, whether the target turned his/her face back during pursuit, when the target turned his/her face back, a turning angle of the target's head turn, whether there is an imaging source in front of the target, whether there are one or more bystanders with similar attributes as the target, a capturing range or angle of an imaging source, and the like).

To solve these and other problems, embodiments described herein generally determine when to break pursuit of a target using a discrimination factor. The discrimination factor represents a degree of differentiation between two or more identifiers. In some embodiments, the discrimination factor represents a degree of differentiation between an identifier for a target and an identifier for an object within a geographical area associated with a possible flee route of the target. In other embodiments, the discrimination factor represents a degree of differentiation between an identifier for a pursuit asset (for example, a covert pursuit asset) and an identifier for an object within the geographical area. Depending on a maturity of the discrimination factor, embodiments described herein notify a pursuit asset when to break pursuit of a target to follow a cornering route.

Accordingly, the embodiments described herein address a need for improved video tracking of a target as well as improved pursuit strategies for intercepting a target using better video tracking and analytics. For example, the embodiments described herein provide a technical solution to the technical problem of how to intercept a target using video or other imaging data with a higher success rate. In other words, the embodiments described herein provide a technical improvement in the technology area of video tracking with respect to smart policing (for example, police cornering solutions, context and analytic solutions for smart policing, and the like), especially when the target is out of view from a pursuit asset while the pursuit asset follows a cornering route.

One example embodiment provides a communication system for pursuing a target. The communication system includes an electronic processor configured to develop a first identifier for the target and determine a breaking junction and an intercept point associated with a cornering route. The electronic processor is also configured to determine a geographical area associated with at least one possible target flee route for the target based on a cornering time for a pursuit asset to arrive at the intercept point and determine a second identifier for an object within the geographical area. The electronic processor is also configured to develop a discrimination factor representing a degree of differentiation of the first identifier from the second identifier. The electronic processor is also configured to predict whether the discrimination factor will exceed a threshold when the pursuit asset arrives at the breaking junction. The discrimination factor exceeds the threshold when the development of the first identifier allows the target to be differentiated from the object within the geographical area. The electronic processor is also configured to, in response to the discrimination factor exceeding the threshold, notify the pursuit asset to break pursuit of the target at the breaking junction to execute the cornering route.

Another example embodiment provides a method for pursuing a target. The method includes developing, with an electronic processor, a first identifier for the target and determining, with the electronic processor, a breaking junction and an intercept point associated with a cornering route. The method also includes determining, with the electronic processor, a geographical area associated with at least one possible target flee route for the target based on a cornering time for a pursuit asset to arrive at the intercept point and determining, with the electronic processor, a second identifier for an object within the geographical area. The method also includes developing, with the electronic processor, a discrimination factor representing a degree of differentiation of the first identifier from the second identifier. The method also includes predicting, with the electronic processor, whether the discrimination factor will exceed a threshold when the pursuit asset arrives at the breaking junction, where the discrimination factor exceeds the threshold when the development of the first identifier allows the target to be differentiated from the object within the geographical area. The method also includes, in response to the discrimination factor exceeding the threshold, notifying, with the electronic processor, the pursuit asset to break pursuit of the target at the breaking junction to execute the cornering route.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of a communication system 100 for pursuing a target in accordance with some embodiments. In the illustrated example, the communication system 100 includes a main computing device 105, an information server 110, an imaging source 115, a pursuit asset communication device 120, and an asset tracking server 125. The main computing device 105, the information server 110, the imaging source 115, the pursuit asset communication device 120, and the asset tracking server 125 communicate through a network 130.

In some embodiments, the communication system 100 includes fewer, additional, or different components than those illustrated in FIG. 1 in various configurations and may perform additional functionality than the functionality described herein. For example, in some embodiments, the main computing device 105, the information server 110, the asset tracking server 125, or a combination thereof are combined into a single system. In such an embodiment, the single system is communicatively coupled to the pursuit asset communication device 120, the imaging source 115, or a combination thereof through the network 130. Additionally, in some embodiments, the communication system 100 includes multiple pursuit asset communication devices 120, multiple imaging sources 115, and the like.

In some embodiments, the network 130 is a wide area network (WAN) (for example, a transport control protocol/ internet protocol (TCP/IP) based network, a cellular network, such as, for example, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/time division multiple access (TDMA)) network, or an Integrated Digital Enhanced Network (iDEN) network, and the like). In other embodiments, the network 130 is a local area network (LAN), a neighborhood area network (NAN), a home area network (HAN), or a personal area network (PAN) employing any of a variety of communications protocols, such as Wi-Fi, Bluetooth, ZigBee, and the like. Other wide area networks, such as land mobile radio (LMR), terrestrial trunked radio (TETRA), and digital mobile radio (DMR) may also be used.

In still other embodiments, the network 130 is a radio access network (RAN). In such embodiments, the network 130 operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

Figure 2:
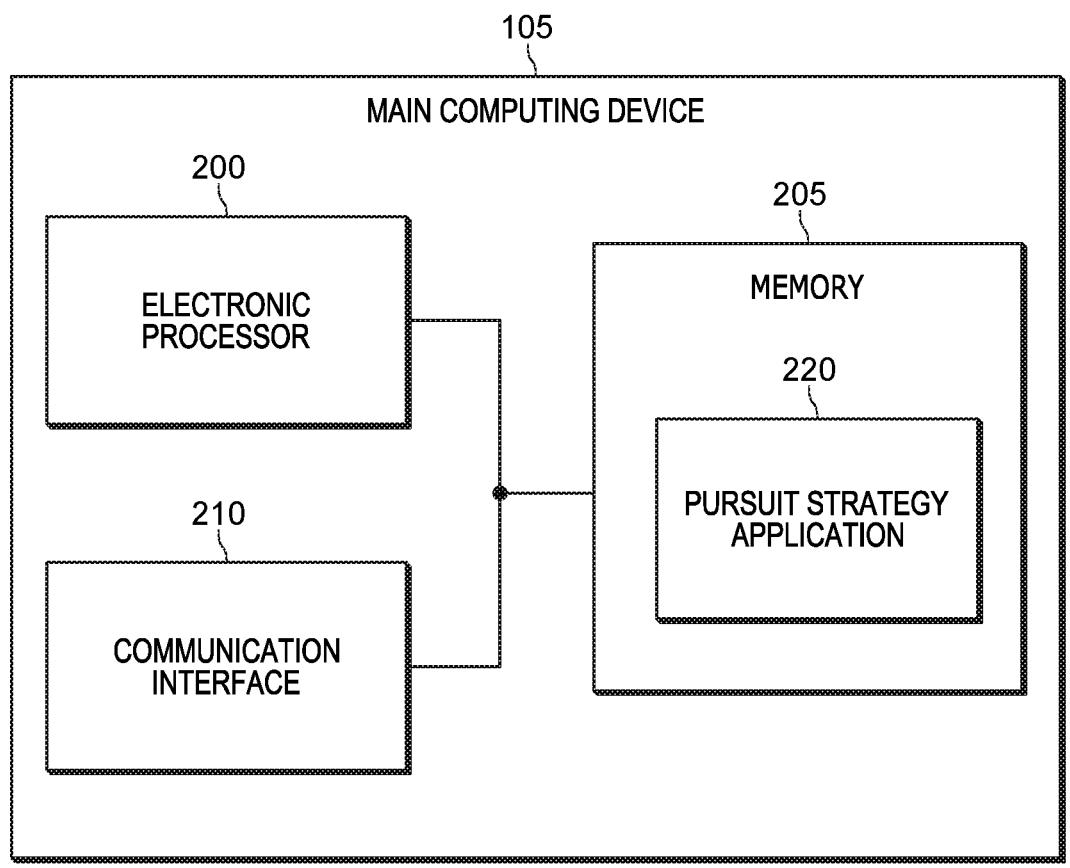
FIG. 2 is a block diagram of a main computing device included in the communication system of FIG. 1 according to some embodiments.

FIG. 2 is a block diagram of the main computing device 105 in accordance with some embodiments. The main computing device 105 includes an electronic processor 200 (for example, a microprocessor, an application-specific integrated circuit (ASIC), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. The main computing device 105 may include additional components than those illustrated in FIG. 2 in various configurations and may perform additional functionality than the functionality described herein. For example, in some embodiments, the functionality described herein as being performed by the main computing device 105 may be distributed among multiple computers or devices (including as part of services offered through a cloud service), may be performed by the pursuit asset communication device 120, the information server 110, the asset tracking server 125, the imaging source 115, or a combination thereof, and the like.

The communication interface 210 allows the main computing device 105 to communicate with devices external to the main computing device 105. For example, as illustrated in FIG. 1, the main computing device 105 may communicate with the information server 110, the imaging source 115, the pursuit asset communication device 120, the asset tracking server 125, or a combination thereof through the network 130. Communications through the network 130 may be protected using one or more encryption techniques, such as those techniques provided in the Institute of Electrical and Electronic Engineers (IEEE) 802.1 (www.ieee802.org/1/) standard for port-based network security, pre-shared key, Extensible Authentication Protocol (EAP), Wired Equivalency Privacy (WEP), Temporal Key Integrity Protocol (TKIP), Wi-Fi Protected Access (WPA), and the like. The connections between the communication interface 210 and the network 130 are, for example, wired connections, wireless connections, or a combination of wireless and wired connections. Accordingly, the communication interface 210 may include a port for receiving a wired connection to an external device (for example, a universal serial bus (USB) cable and the like), a transceiver for establishing a wireless connection to an external device (for example, over the network 130), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 may store a pursuit strategy application 220. The pursuit strategy application 220 receives information through the network 130 from the information server 110, the imaging source 115, the asset tracking server 125, the pursuit asset communication device 120, or a combination thereof. The pursuit strategy application 220 uses the information to develop a discrimination factor representing a degree of differentiation between two or more identifiers. The pursuit strategy application 220 may also use the information to determine a cornering route based on the discrimination factor. As noted above, when a cornering route is prematurely initiated, a target may not be able to be securely tagged upon completion of the cornering route at the intercept point. Accordingly, in some embodiments, the pursuit strategy application 220 determines the cornering route based on a maturity of the discrimination factor (for example, how developed the discrimination factor is).

The information server 110 provides information to the main computing device 105. In some embodiments, the information server 110 provides map information based on an analysis of a map. A map may include a reference map (for example, a road map, a geographical map, a topographical map, a political boundary map, and the like), a map of local attractions or businesses (for example, retail stores, concert halls, sports arenas, parks, schools, and the like), a zoning map (for example, a school zone, an abandoned building, a hazardous building, a residential zone, a commercial zone, and the like), another type of map, or a combination thereof. The information server 110 analyzes the map to determine map information relating to an address, geographical coordinates, a neighborhood layout or grid, a point of ingress, a point of egress, and the like.

The information server 110 may provide additional information to the main computing device 105. The additional information may include a light intensity or a type of light (for example, indoor light, outdoor light, evening light, morning light, afternoon light, night light, moon light, artificial light, sunlight, and the like), a building type (for example, residential, commercial, abandoned, entertainment, hazardous, and the like), a type of open space (for example, a field, a market place, an outdoor concert hall, an alleyway, and the like), a time of day (for example, morning, evening, afternoon, night, lunch time, typical business hours, and the like), an event (for example, a farmer's market, a festival, a concert, a sporting event, and the like), a season (for example, a holiday season, such as Christmas or New Year's, a summer season, a school season, a school holiday, and the like), a weather condition (for example, cloudy, rainy, sunny, and the like), other information that impacts a pursuit of a target, or a combination thereof.

The additional information may relate to how populated a particular geographical area is. For example, the additional information may include a bystander density level representing a number of bystanders at a geographical area, such as at an intercept point of a cornering route. In some embodiments, how populated an area is depends on a time of day, a day of week, a special event, and similar information. For example, when a sporting event is scheduled for a certain day, streets near a stadium holding the sporting event may be assumed to be populated with foot traffic, vehicular traffic, or a combination thereof. In another example, certain areas during business hours may experience a high level of foot traffic, such as an entrance to an office building experiencing a high level of foot traffic at 8:00 AM or 5:00 PM on Monday through Friday.

The imaging source 115 collects imaging data. Imaging data includes one or more still images, one or more videos, and the like. The imaging source 115 may include a fixed camera (for example, a closed-circuit television (CCTV), a surveillance camera, or a traffic enforcement camera), an aerial camera (for example, a news helicopter or a police helicopter), a body-worn camera (for example, a police body-worn camera), a vehicular camera (for example, a police vehicle camera), an Internet streaming camera (for example, a webcam), and the like. In some embodiments, the imaging source 115 transmits the imaging data to the main computing device 105. Alternatively or in addition, the imaging source 115 may transmit the imaging data to a storage device, such as an imaging database, for storage.

The pursuit asset communication device 120 is associated with a pursuit asset. In some embodiments, the pursuit asset communication device 120 is or includes a personal or hand-held device, such as a smart telephone, a tablet, a laptop, a heads-up display, head-mounted glasses, and the like. In other embodiments, the pursuit asset communication device 120 is a navigation unit or a communication unit located within a law enforcement vehicle, such as a police cruiser (human-driven or autonomous vehicle), a police helicopter, an unmanned aerial vehicle (for example, a drone), and the like. The pursuit asset communication device 120 transmits and receives information between a pursuit asset and one or more external devices, such as the main computing device 105. The information transmitted between the pursuit asset communication device 120 and the main computing device 105 includes information for pursuing a target (for example, instructions for following a cornering route). In some embodiments, the pursuit asset communication device 120 includes substantially similar components to the main computing device 105 (for example, a communication interface, a memory, and an electronic processor). In other embodiments, the pursuit asset communication device 120 includes more or less components than the main computing device 105. For example, the pursuit asset communication device 120 may include one or more output and output mechanisms, such as a microphone, a speaker, a display, a buttons, and the like, for receiving and transmitting information.

In some embodiments, the pursuit asset communication device 120 includes a mobile device transmitter. The mobile device transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the mobile device transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

The asset tracking server 125 monitors one or more pursuit assets. The asset tracking server 125 determines pursuit asset information by monitoring a location and a status of a pursuit asset. The asset tracking server 125 provides the pursuit asset information to the main computing device 105. A location of a pursuit asset may be tracked using, among other things, satellite navigation tracking (for example, global navigation satellite system (GNSS) tracking, global positioning system (GPS) tracking, Galileo tracking, Indian Regional Navigation Satellite System (IRNSS) tracking, GLObal NAvigation System (GLONAS) tracking, BeiDou Navigation Satellite System, and the like), cellular telephone tracking (for example, triangulation, network-based tracking, handset-based tracking, subscriber identification module (SIM) based tracking, WiFi-based tracking, and the like), and indoor location tracking (for example, dead reckoning using accelerometer, gyrometer, magnetometer, or beacon-based tracking using a Bluetooth signal). A status of a pursuit asset may include, among other things, a pursuit status (for example, whether a pursuit asset is currently in pursuit of a target) and an operational status (for example, whether a pursuit asset is parked at a garage, stopped at a traffic light, traveling on a highway, and the like).

In some embodiments, the information server 110 and the asset tracking server 125 include substantially similar components to the main computing device 105 (for example, a communication interface, a memory, and an electronic processor). In other embodiments, the information server 110 and the asset tracking server 125 include more or less components than the main computing device 105. Additionally, in some embodiments, the information server 110 and the asset tracking server 125 are combined with the main computing device 105.

Figure 3:
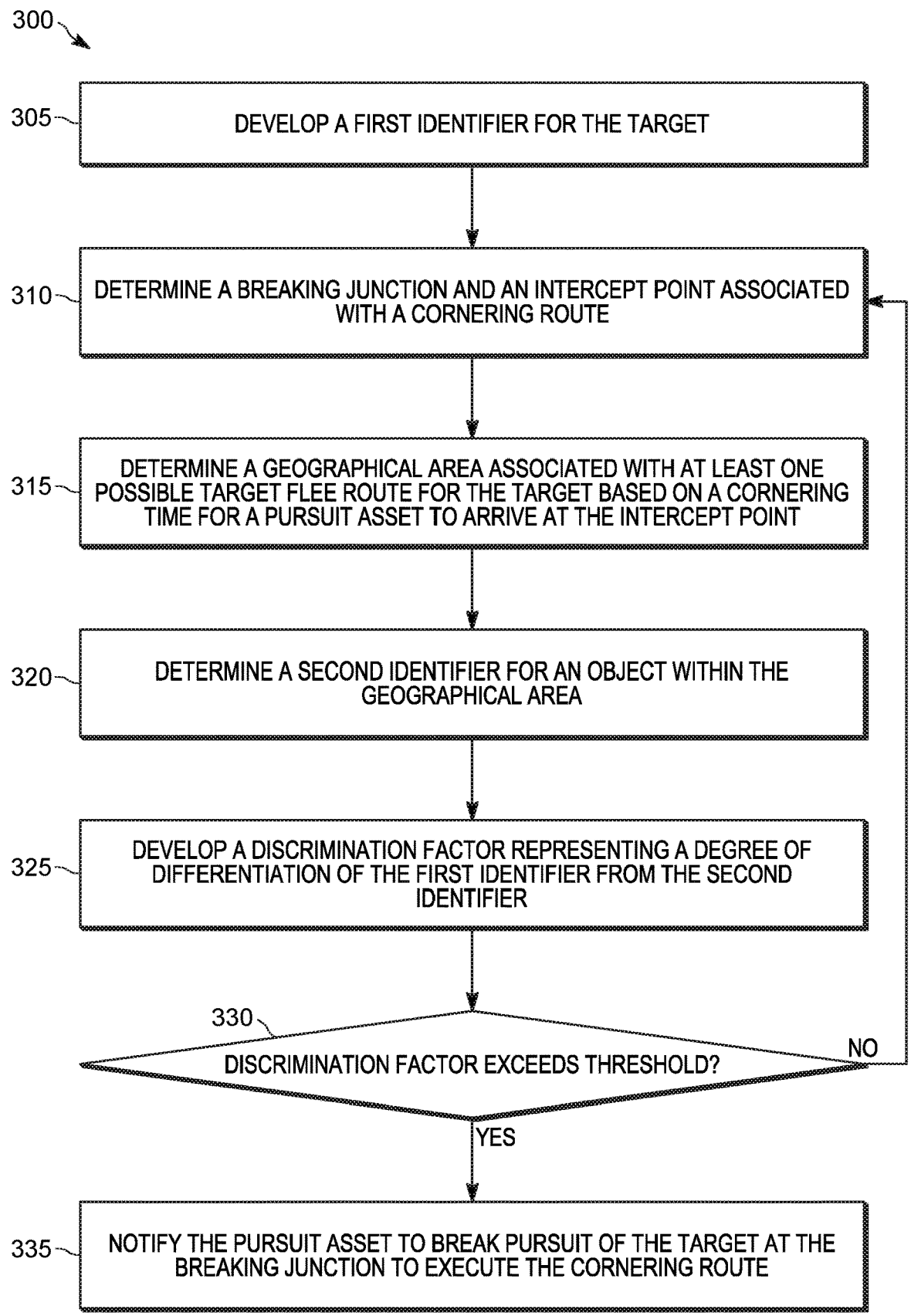
FIG. 3 is a flowchart illustrating a method of pursuing a target using the communication system of FIG. 1 according to some embodiments.

FIG. 3 is a flowchart illustrating a method 300 of pursuing a target according to some embodiments. The method 300 is described herein as being performed by the main computing device 105 (the electronic processor 200 executing instructions). However, as noted above, the functionality performed by the main computing device 105 (or a portion thereof) may be performed by other devices, included, for example, the pursuit asset communication device 120, the information server 110, the asset tracking server 125, or a combination thereof (via an electronic processor executing instructions).

In some embodiments, the method 300 is initiated in response to the electronic processor 200 receiving a command, such as a command to tag a target. The command may be initiated manually by a pursuit asset engaged in a pursuit of a target, a pursuit asset who is not actively engaged in a pursuit of a target (for example, a law enforcement dispatcher), and the like. Alternatively or in addition, in some embodiments, the method 300 is initiated in response to a pursuit trigger. A pursuit trigger may include identifying a target, such as a wanted target, based on data collected by the imaging source 115, another source, or a combination thereof. Alternatively or in addition, a pursuit trigger may include identifying when a pursuit asset initiates a pursuit of a target based on, for example, verbal communication of the pursuit asset, when a behavior of a pursuit asset changes (for example, the pursuit asset starts running or driving faster or turns on a siren), and the like.

A target to be tagged may be determined by assistance from a pursuit asset. For example, a pursuit asset may use a hand gesture to point towards the target, a law enforcement dispatcher may remotely point to a target image on a display captured by the imaging source 115, a pursuit asset following the target during the pursuit may provide direction and location information of the target to the imaging source, and the like.

As illustrated in FIG. 3, the electronic processor 200 develops a first identifier for the target (at block 305). The electronic processor 200 develops the first identifier using the imaging data collected by and received from the imaging source 115. The electronic processor 200 develops the first identifier by extracting a plurality of attributes associated with the target from the imaging data. An attribute is a characteristic or feature of the target, such as a facial attribute, a gait attribute, a body attribute, an attire attribute, or a combination thereof.

A facial attribute is a facial characteristic or feature. For example, a facial attribute may include an eye color, a presence of glasses, a hair color, a hair length, a hair style, a distinguishing facial mark or feature (for example, a tattoo, a birth mark, a burn mark, and the like), a presence of make-up, a type of facial hair, a color of facial hair, a head shape, a hat, a hair accessory, a piercing, and the like.

A gait attribute is a gait characteristic or feature. For example, a gait attribute may include a gait type (for example, a waddling gait, a scissors gait, a spastic gait, and the like), a gait speed, a gait stability, a limp, a stride length, a walking pattern, a running pattern, a sitting pattern, and the like.

A body attribute is a body characteristic or feature. For example, a body attribute may include a gender, a weight, a height, a limb length, a body abnormality, an ethnicity, a skin tone, a voice signature, an age or age range, a distinguishing mark or feature (for example, a tattoo, a birth mark, a burn mark, and the like), and the like.

An attire attribute is an attire characteristic or feature. For example, an attire attribute may include an attire color, an attire length (for example, short sleeves, long sleeves, capris, shorts, and the like), an attire type (for example, a sports jersey, a t-shirt, a dress, a skirt, a swimsuit, and the like), a piercing, an accessory, a brand of attire, and the like.

As pursuit of the target continues, additional imaging data is collected by the imaging source 115. As additional imaging data is collected, the electronic processor continues to extract attributes from the additional imaging data. Accordingly, as the pursuit progresses, the maturity of the first identifier increases as a result of the electronic processor 200 continuously developing and refining the first identifier.

FIGS. 4A-4E illustrate stages of a pursuit between a pursuit asset 400 and a target 405. In the illustrated example, the imaging sources 115 include a body worn camera 115A worn by the pursuit asset 400 and a fixed camera 115B positioned at a stationary location ahead of the target 405. The body worn camera 115 collects imaging data associated with a first image capturing range 410A and the fixed camera 115B collects imaging data associated with a second image capturing range 410B. Each illustrated stage includes a corresponding bar graph 420A-420E representing a development of the first identifier of the target 405. Each bar graph 420A-420E is broken down to illustrate the development of the first identifier with respect to a facial attribute, a gait attribute, a body attribute, and an attire attribute of the target 405.

Figure 4A:
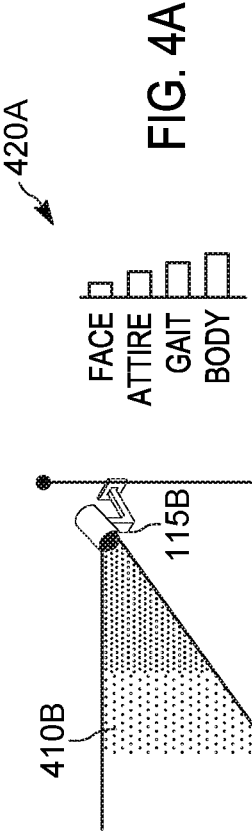

FIG. 4A illustrates a first stage of the pursuit. During the first stage, the body worn camera 115A captures a back view of the target 405 and the fixed camera 115B captures a front view of the target 405. Therefore, the imaging data collected during the first stage includes a back view of the target 405 and a front view of the target 405. The electronic processor 200 extracts one or more attributes from the back view and the front view of the target 405 to develop the first identifier, as reflected in the bar graph 420A. In the first stage, the target 405 is within a closer proximity of the body worn camera 115A than the fixed camera 115B. Accordingly, although the fixed camera 115B may capture imaging data relating to a face of the target 405, the distance between the fixed camera 115B and the target 405 may degrade the quality of the imaging data relating to the face of the target 405, as reflected in the bar graph 420A.

Figure 4B:
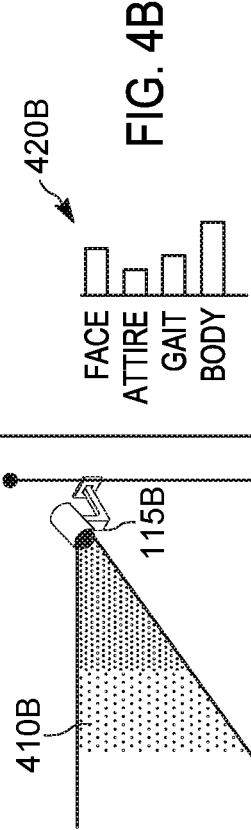

FIG. 4B illustrates a second stage of the pursuit. During the second stage, the target 405 turns his/her head back towards the pursuit asset 400. By the target 405 turning his/her head back towards the pursuit asset 400, the body worn camera 115A captures imaging data relating to a face of the target 405. Therefore, the electronic processor 200 may further develop the first identifier by extracting additional facial attributes associated with the target 405, as reflected in the bar graph 420B.

Figure 4C:
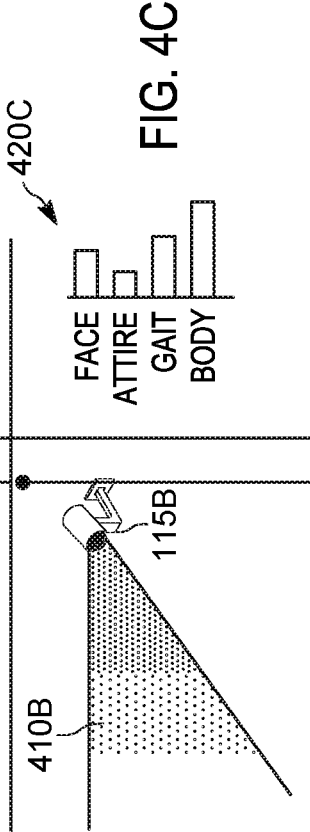

FIG. 4C illustrates a third stage of the pursuit. During the third stage, the body worn camera 115A continues to capture the back view of the target 405 and the fixed camera 115B continues to capture the front view of the target 405. With the additional imaging data collected with respect to the back view and the front view of the target 405, the electronic processor 200 may further develop the first identifier by extracting attributes associated with the target 405 from the additional imaging data, as reflected in the bar graph 420C.

FIG. 4D illustrates a fourth stage of the pursuit. During the fourth stage, the target 405 turns his/her head back towards the pursuit asset 400. However, as illustrated in FIG. 4D, the first image capturing range 410A of the body worn camera 115A has shifted. As a result of the first image capturing range 410A shifting, the body worn camera 115A does not capture imaging data relating to the face of the target 405. Therefore, as reflected in the bar graph 420D, the electronic processor 200 further develops the first identifier based on one or more extracted attire attributes, gait attributes, and body attributes.

FIG. 4E illustrates a fifth stage of the pursuit. During the fifth stage, the target 405 is closer to the fixed camera 115B such that the face of the target 405 may be captured by the fixed camera 115B. As a result, the electronic processor 200 is able to further develop the first identifier by extracting additional face attributes associated with the target 405, as reflected in the bar graph 420E.

As reflected in the bar graphs 420E-420E, as the pursuit progresses, the maturity of the identifier of the target 405 also increases. As illustrated in FIGS. 4A-4E, the electronic processor 200 may develop the first identifier with imaging data collected at different times, with different imaging sources (for example, the body-worn camera 115A and the fixed camera 115B), and from different front of view perspectives.

Figure 5:
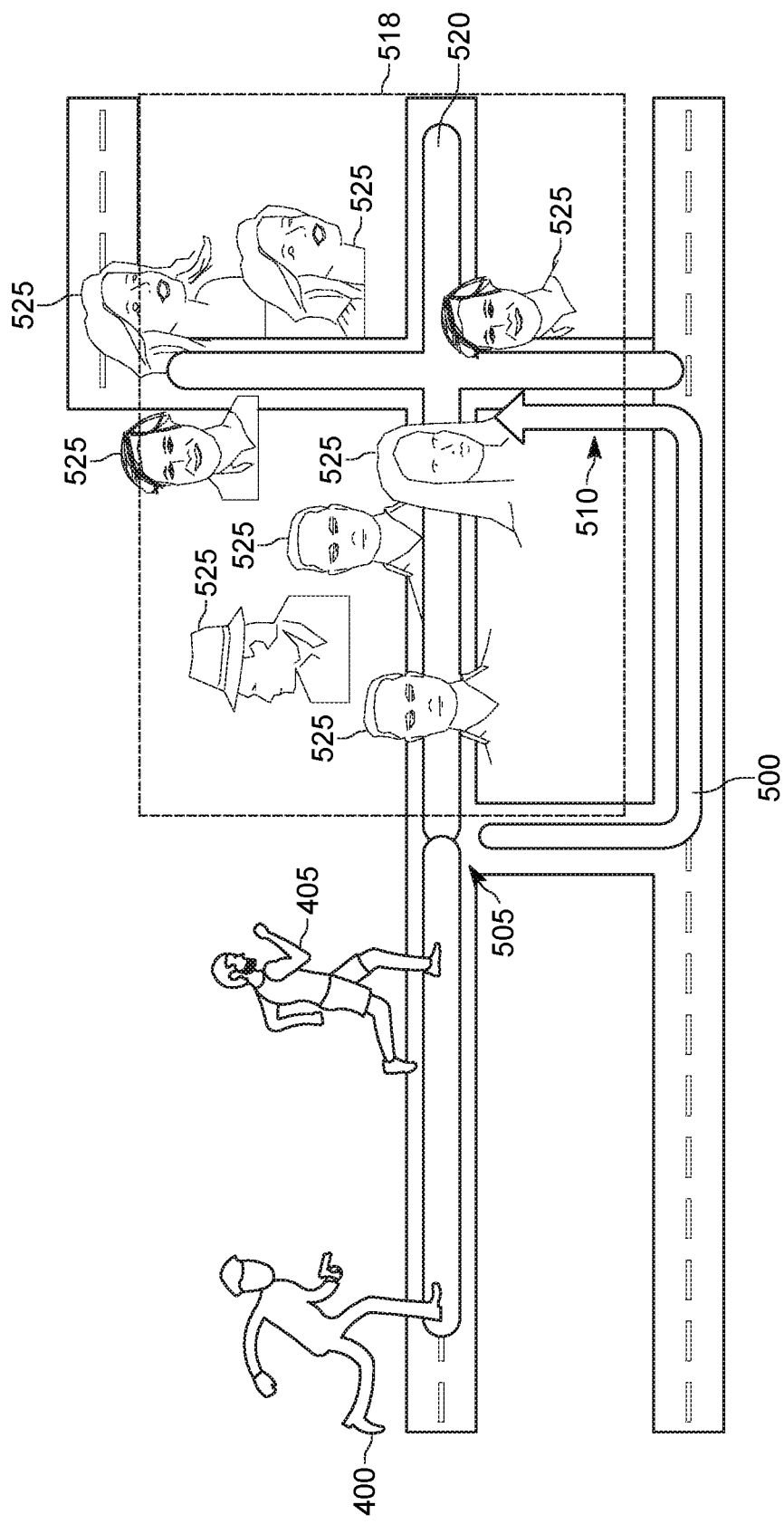
FIG. 5 illustrates a cornering route according to some embodiments.

Returning to FIG. 3, the electronic processor 200 also determines a breaking junction and an intercept point associated with a cornering route (at block 310). A cornering route is a route that, when followed by a pursuit asset 400, may corner a target 405. FIG. 5 illustrates a cornering route 500 according to some embodiments. In the example illustrated, the cornering route 500 includes a breaking junction 505 and an intercept point 510. The breaking junction 505 is a junction (for example, an intersection, an alleyway, a path, and the like) where the pursuit asset 400 may break pursuit of the target 405 in order to follow the cornering route 500. The intercept point 510 is a location or point where the pursuit asset 400 intercepts (or corners) the target 405. In other words, the breaking junction 505 is a starting point of the cornering route 500 and the intercept point 510 is an ending point of the cornering route 500.

The electronic processor 200 may determine the cornering route 500, including the breaking junction 505 and the intercept point 510, using information from the information server 110 (for example, the map information, the additional information, or a combination thereof).

In some embodiments, the electronic processor 200 determines the cornering route 500 by determining a plurality of possible cornering routes and identifying one of the possible cornering routes as more favorable. The electronic processor 200 identifies a possible cornering route as more favorable based on one or more conditions associated with the possible cornering route.

A condition of a possible cornering route may relate to conditions for differentiating the target 405 from an object within the geographical area 518. For example, a first cornering route may provide a first degree of differentiation between the target 405 and an object within a first geographical area that the target 405 may move towards upon seeing the pursuit asset 400 following the first cornering route. A second cornering route may provide a second degree of differentiation between the target 405 and an object within a second geographical area that the target 405 may move towards upon seeing the pursuit asset 400 following the second cornering route. The first degree of differentiation of the first cornering route may provide a higher degree of differentiation that the second degree of differentiation of the second cornering route. Accordingly, in this example, the first cornering route is more favorable than the second cornering route. Additionally, in this example, a selected cornering route may influence which geographical area the target 405 may move towards when the target 405 observes which cornering route the pursuit asset 400 is following.

Alternatively or in addition, a condition of a possible cornering route may relate to conditions for differentiating the pursuit asset 400 from an object along the cornering route. For example, a cornering route may be favorable when the pursuit asset 400 may be less differentiated from an object along the cornering route such that the target 405 has more difficulty in identifying a location of the pursuit asset 400.

The electronic processor 200 determines a condition based on the additional information received from the information server 110. As noted above, the additional information may relate to how populated a particular geographical area is, one or more environmental factors, or a combination thereof. For example, a possible cornering route that travels through a heavily populated area is less favorable than another possible cornering route that travels through a less populated area. As another example, a possible cornering route that travels through an alleyway or an outdoor concert is less favorable than another possible cornering route that travels through an open field. Accordingly, in some embodiments, the electronic processor 200 determines the cornering route 500 based on one or more conditions associated with possible cornering routes.

In some embodiments, the electronic processor 200 determines the cornering route 500 for the pursuit asset 400 based on pursuit asset information for one or more additional pursuit assets. The electronic processor 200 receives the pursuit asset information for the additional pursuit asset from the asset tracking server 125. As noted above, the pursuit asset information includes a location and a status of additional pursuit assets. Therefore, using the pursuit asset information for the additional pursuit asset, the electronic processor 200 may determine whether an additional pursuit asset is actively pursuing the target 405 or planning on joining the pursuit of the target 405. When the electronic processor 200 determines that an additional pursuit asset has joined, or is planning on joining, the pursuit, the electronic processor 200 may determine the cornering route 500 for the pursuit asset 400 based on a route of the additional pursuit asset. Similarly, the electronic processor 200 may also determine an additional cornering route for the additional pursuit asset based on the cornering route 500 determined from the pursuit asset 400. In some instances, the electronic processor 200 may determine the cornering route 500 for the pursuit asset 400, the additional cornering route for the additional pursuit asset, or a combination thereof based on a shortest cornering time, a shortest cornering route, or a combination thereof.

After determining the breaking junction 505 and the intercept point 510 associated with the cornering route 500 (at block 310), the electronic processor 200 determines a geographical area associated with at least one possible target flee route for the target 405 based on a cornering time for the pursuit asset 400 to arrive at the intercept point 510 (at block 315). The electronic processor 200 may determine the geographical area using information provided by the information server 110 over the network 130. As illustrated in FIG. 5, the geographical area 518 represents a virtual geographical boundary (for example, a geofence) that includes one or more possible target flee routes 520.

As noted above, the electronic processor 200 determines the geographical area 518 based on a cornering time for the pursuit asset 400 to arrive at the intercept point 510. With reference to FIG. 5, a cornering time is the time for the pursuit asset 400 to arrive at the intercept point 510 from the breaking junction 505. The target 405 may be out of view of the pursuit asset 400 while the pursuit asset 400 follows the cornering route 500. During the cornering time, the target 405 may follow one or more possible target flee routes 520. A possible target flee route 520 is a route that the target 405 may follow in an attempt to evade the pursuit asset 400. For example, the target 405 may follow a possible target flee route 520 while the pursuit asset 400 is following the cornering route 500 and the target 405 is out of view of the pursuit asset 400. Therefore, the electronic processor 200 determines the geographical area 518 such that the geographical area includes one or more possible target flee routes 520 that the target 405 may follow during the cornering time of the cornering route 500. In these examples, though the target 405 may be out of view of the pursuit asset 400 while the pursuit asset 405 follows the cornering route 500, the imaging source 115 may continue tracking (or "tagging") the target 405 as the target 405 continues to follow a possible target flee route 520. Thus, embodiments described herein provide secure tracking of the target 405 such that another object within the geographical area 518 is not mistakenly tracked while the target 405 follows a possible target flee route 520 after the pursuit asset 400 breaks pursuit.

After determining the geographical area 518 (at block 315), the electronic processor 200 determines a second identifier for an object within the geographical area 518 (at block 320). An object within the geographical area 518 may include a bystander, a building, a vehicle, a location or area, an additional pursuit asset (for example, a covert pursuit asset), and the like. In the illustrated example of FIG. 5, the geographical area 518 includes a plurality of bystanders 525 (referred to herein collectively as "the bystanders 525" or individually as "the bystander 525").

In some embodiments, the electronic processor 200 develops the second identifier in a similar manner as described above with respect to the first identifier of the target as shown at block 305. In particular, the electronic processor 200 develops the second identifier using imaging data associated with the object. The imaging data associated with the object may be collected from an imaging source 115 located within the geographical area 518. The electronic processor 200 extracts one or more attributes from the imaging data associated with the object. Where the object within the geographical area 518 is a person, such as a bystander or an additional pursuit asset, the electronic processor 200 extracts facial attributes, gait attributes, attire attributes, and body attributes from the imaging data. When the object within the geographical area 518 is a vehicle, the electronic processor 200 extracts one or more vehicle attributes from the imaging data. A vehicle attribute may include a vehicle make, a vehicle model, a vehicle color, a number of passengers, a distinguishing mark or feature (for example, a dent or missing side mirror), a vehicle customization (for example, a spoiler or a vehicle decal), and the like. When the object within the geographical area 518 is a building, the electronic processor 200 extracts one or more building attributes from the imaging data. A building attribute may include a building type (for example, a house, an apartment building, a commercial building, a restaurant, and the like), a building material (for example, brick), a building height (for example, a number of floors), and the like. When the object within the geographical area 518 is a location or an area, the electronic processor 200 may extract one or more location attributes from the imaging data. A location attribute may include a light intensity or a type of light (for example, indoor light, outdoor light, evening light, morning light, afternoon light, night light, moon light, artificial light, sunlight, and the like), a type of location or space (for example, an alley way, an open field, a park, and the like), a population (for example, a bystander density level at the location or space), and the like.

Alternatively or in addition, in some embodiments, the electronic processor 200 develops the second identifier based on the information from the information server 110. For example, when the object within the geographical area 518 is a location, the electronic processor 200 may use the additional information from the information server 110 to determine a type of location for developing an identifier for the location.

The electronic processor 200 develops a discrimination factor (at block 325). A discrimination factor represents a degree of differentiation between two or more identifiers, such as the first identifier of the target 405 and the second identifier of an object within the geographical area 518. In other words, the discrimination factor represents a confidence (or likelihood) of differentiating the target 405 from an object within the geographical area 518. A stronger (or more mature) discrimination factor represents a higher likelihood of differentiating the target 405 from an object. A weaker (or less mature) discrimination factor represents a lower likelihood of differentiating the target 405 from an object. In some embodiments, the electronic processor 200 continuously develops the discrimination factor regardless of whether the target 405, the pursuit asset 400, or a combination thereof are moving or standing still.

In some embodiments, the electronic processor 200 develops the discrimination factor based on the additional information associated with the cornering route 500 (for example, the intercept point 510). The additional information may include information relating to conditions that impact the ability to differentiate the target 405 from an object within the geographical area 518. For example, the additional information may indicate that the lighting at the intercept point 510 is low. As another example, the additional information may indicate that a school located near the intercept point 510 is about to end for the day.

The electronic processor 200 may develop the discrimination factor by comparing two or more identifiers, such as the first identifier of the target 405 and the second identifier of an object in the geographical area 518. As noted above, an identifier may be determined by extracting one or more attributes from the imaging data. Therefore, the electronic processor 200 may develop the discrimination factor by comparing attributes extracted from imaging data for the target 405 and attributes extracted from imaging data for an object within the geographical area 518.

For example, FIGS. 6A-6E are tables listing attributes extracted by the electronic processor 200 after a first pursuit duration. FIG. 6A is a table listing attributes extracted for the first identifier of the target 405. As seen in FIG. 6A, no facial attributes have been extracted. However, the electronic processor 200 has extracted some body attributes (for example, a height and a weight), gait attributes (for example, a running pattern), and attire attributes (for example, a back view, a yellow shirt, and blue pants) for the target 405.

FIG. 6B is a table listing attributes extracted for an identifier of a first bystander within the geographical area 518. As seen in FIG. 6B, the electronic processor 200 has extracted some facial attributes (for example, a face shape), body attributes (for example, a height and a weight), gait attributes (for example, a walking pattern), and attire attributes (for example, a front view and a yellow shirt) for the first bystander.

FIG. 6C is a table listing attributes extracted for an identifier of a second bystander within the geographical area 518. As seen in FIG. 6C, the electronic processor 200 has extracted some facial attributes (for example, a face shape), body attributes (for example, a height and a weight), gait attributes (for example, a running pattern), and attire attributes (for example, a front view, a yellow shirt, and blue pants) for the second bystander.

FIG. 6D is a table listing attributes extracted for an identifier of a third bystander within the geographical area 518. As seen in FIG. 6D, the electronic processor 200 has not extracted any facial attributes for the third bystander. However, the electronic processor 200 has extracted some body attributes (for example, a height and a weight), gait attributes (for example, a sitting pattern), and attire attributes (for example, a back view and a yellow shirt) for the third bystander.

FIG. 6E is a table listing attributes extracted for an identifier of a fourth bystander within the geographical area 518. As seen in FIG. 6E, the electronic processor 200 has not extracted any facial attributes for the fourth bystander. However, the electronic processor 200 has extracted some body attributes (for example, a height and a weight), gait attributes (for example, a running pattern), and attire attributes (for example, a blue shirt) for the fourth bystander.

By comparing the attributes extracted for the target 405 and the attributes extracted for each of the bystanders 525 during the first pursuit duration, the electronic processor 200 may develop a discrimination factor for the target 405 against each of the bystanders 525. For example, with reference to FIG. 6A and FIG. 6B, the target 405 and the first bystander have similar heights and weights and are both wearing a yellow shirt. With reference to FIG. 6A and FIG. 6C, the target 405 and the second bystander have similar heights and weights and are both wearing a yellow shirt and blue pants. With reference to FIG. 6A and FIG. 6D, the target 405 and the third bystander have similar heights and weights, are both wearing a yellow shirt, and were both similarly captured from a back view. In contrast, with reference to FIG. 6A and FIG. 6E, the target 405 and the fourth bystander share no similarities. Therefore, the target 405 is more easily differentiated from the fourth bystander than from the first bystander, the second bystander, and the third bystander. Accordingly, based on the current imaging data available to the electronic processor 200 during the first pursuit duration, the electronic processor 200 may identify the first bystander, the second bystander, and the third bystander as matches with the target 405 and may identify the fourth bystander as not a match with the target 405. In other words, there is a high likelihood that the first bystander, the second bystander, the third bystander, or a combination thereof may be mistakenly tagged as the target 405. In this example, the discrimination factor (or the degree of differentiation) between the target 405 and the first bystander, the second bystander, or the third bystander is low while the discrimination factor between the target 405 and the forth bystanders is high.

However, as the pursuit progresses, the electronic processor 200 continuously develops and refines the identifiers. This continuous development and refinement process results in a more mature identifier. As the maturity of the identifiers increases, the strength (or maturity) of the discrimination factor also increases. In other words, the more mature two or more identifiers are, the more mature a discrimination factor associated with the two or more identifiers is. Accordingly, the discrimination factor may be strengthened by allowing additional pursuit time before breaking pursuit to allow for the collection of additional imaging data from the imaging source 115.

In some embodiments, after determining that an object within the geographical area 518 is not a match with (is differentiated from) the target 405, the electronic processor 200 stops extracting attributes associated with the differentiated object. However, in other embodiments, the electronic processor 200 continues to extract attributes associated with the differentiated object. The electronic processor 200 may continue to extract attributes associated with the differentiated object to strengthen (or confirm) the discrimination factor between the differentiated object and the target 405. In the illustrated example, the electronic processor 200 stops extracting attributes once a match is determined.

FIGS. 7A-7D are updated tables listing attributes extracted by the electronic processor 200 after a second pursuit duration. The second pursuit duration is longer than the first pursuit duration of FIGS. 6A-6E. With the additional pursuit time afforded by the second pursuit duration, the electronic processor 200 may further develop and refine the identifiers of FIGS. 6A-6E.

FIG. 7A illustrates an updated table from FIG. 6A listing attributes extracted for the first identifier of the target 405 after the second pursuit duration. As seen in FIG. 7A, the electronic processor 200 refined the first identifier of the target 405 by extracting facial attributes (for example, a left partial face and short hair) for the target 405. Additionally, the electronic processor 200 extracted additional attire attributes (for example, long sleeve and long pant) for the target 405.

FIG. 7B illustrates an updated table from FIG. 6B listing attributes extracted for the identifier of the first bystander after the second pursuit duration. As seen in FIG. 7B, the electronic processor 200 refined the identifier of the first bystander by extracting facial attributes (for example, right partial face and short hair) for the first bystander. Additionally, the electronic processor 200 extracted additional gait attributes (for example, a running pattern) and attire attributes (for example, a green cap) for the first bystander.

FIG. 7C illustrates an updated table from FIG. 6C listing attributes extracted for the identifier of the second bystander after the second pursuit duration. As seen in FIG. 7C, the electronic processor 200 refined the identifier of the second bystander by extracting additional facial attributes (for example, left partial face) and attire attributes (for example, long sleeve, long pant, and a particular brand of shoes) for the second bystander.

FIG. 7D illustrates an updated table from FIG. 6D listing attributes extracted for the identifier of the third bystander after the second pursuit duration. As seen in FIG. 7D, the electronic processor 200 refined the identifier of the third bystander by extracting additional facial attributes (for example, 80% of face features) and attire attributes (for example, short sleeve) for the third bystander.

With the additional pursuit time afforded by the second pursuit time duration, the electronic processor 200 further develops and refines the identifiers and, ultimately, develops a more mature discrimination factor. For example, with the additional pursuit time of the second pursuit duration, the discrimination factor is developed to a point where the target 405 is differentiated from the third bystander. With reference to the updated tables of FIGS. 7A and 7D, the facial attributes of the target 405 in comparison to the facial attributes of the third bystander are now distinguishable to the point where the target 405 will be confidently distinguished from the third bystander. Accordingly, in some embodiments, the electronic processor 200 stops extracting attributes for the third bystander. Although the electronic processor 200 further developed and refined the identifiers for the first bystander and the second bystander, the identifiers for the first bystander and the second bystanders are not distinguishable to a point where the target 405 will be confidently distinguished from the first bystander and the second bystander.

FIGS. 8A-8C are tables listing attributes extracted by the electronic processor 200 after a third pursuit duration. The third pursuit duration is longer than the second pursuit duration of FIGS. 7A-7C. With the additional pursuit time afforded by the third pursuit duration, the electronic processor 200 may further develop and refine the identifiers of FIGS. 7A-7C.

FIG. 8A illustrates an updated table from FIG. 7A listing attributes extracted for the first identifier after the third pursuit duration. As seen in FIG. 8A, the electronic processor 200 refined the first identifier by extracting additional facial attributes (for example, 60% of facial features, 30% of left view, and dyed brown hair), body attributes (for example, no tattoo on leg), and attire attributes (for example, a front view, a particular brand logo on front of shirt, and a particular brand of shoe).

FIG. 8B illustrates an updated table from FIG. 7B listing attributes extracted for the identifier of the first bystander after the third pursuit duration. As seen in FIG. 8B, the electronic processor 200 refined the identifier of the first bystander by extracting facial attributes (for example, 90% of facial features), body attributes (for example, a tattoo on a leg), and attire attributes (for example, a plain shirt front) for the first bystander.

FIG. 8C illustrates an updated table from FIG. 7C listing attributes extracted for the identifier of the second bystander after the third pursuit duration. As seen in FIG. 8C, the electronic processor 200 refined the identifier of the second bystander by extracting additional facial attributes (for example, 93% of left view) for the second bystander.

With the additional pursuit time of the third pursuit duration, the electronic processor 200 further develops and refines the identifiers and, ultimately, develops a more mature discrimination factor. In the illustrated example, the discrimination factor is developed to a point where the target 405 is differentiated from the first bystander and the second bystander. For example, with reference to FIGS. 8A and 8B, the facial attributes and the body attributes of the target 405 in comparison to the first bystander are now distinguishable to the point where the target 405 will be confidently distinguished from the first bystander. Additionally, with reference to FIGS. 8A and 8C, the facial attributes and the attire attributes of the target 405 in comparison to the second bystander are now distinguishable to the point where the target 405 will be confidently distinguished from the second bystander. In this example, the discrimination factor between the target 405 and the first bystander and the second bystander is now high (or exceeding a threshold).

Some attributes of the target 405 may be easily altered during the cornering time when the target 405 is not in view of the pursuit asset 400. For example, the target 405 may easily remove a hat or a pair of glasses during the cornering time. However, other attributes of the target 405 may not be easily altered during the cornering time. For example, the target 405 may not easily change a height, a weight, or a gender during the cornering time.

Accordingly, in some embodiments, when developing the discrimination factor, the electronic processor 200 considers an alterability of an attribute during the cornering time. The electronic processor 200 determines an alterability of an attribute by determining an alteration time associated with an attribute and comparing the alteration time to the cornering time. When the alteration time is less than the cornering time, the attribute may be altered during the cornering time. When the alteration time is more than the cornering time, the attribute may not be altered during the cornering time.

Based on whether the attribute may be altered during the cornering time, the electronic processor 200 may apply a weight to the attribute extracted from the imaging data. An attribute that is easily altered during the cornering time may have a lower weight. An attribute that is not easily altered during the cornering time may have a higher weight. The weight applied to an attribute may be predetermined based on whether the attribute is a body attribute, an attire attribute, a facial attribute, or a gait attribute. The electronic processor 200 may then develop the discrimination factor based on the weighted attributes. In some embodiments, the electronic processor 200 develops the discrimination factor using only attributes that cannot be easily altered within the cornering time and disregards attributes that can be easily altered within the cornering time.

As noted above, the discrimination factor may be strengthened by allowing additional pursuit time. Therefore, depending on the strength of a discrimination factor, breaking pursuit at a later breaking junction may be advantageous over breaking pursuit at an earlier breaking junction. Accordingly, in some embodiments, the electronic processor 200 predicts whether the discrimination factor will exceed a threshold when the pursuit asset 400 arrives at the breaking junction 505 (at block 330). The threshold may represent a degree of differentiation between the target 405 and an object within the geographical area 518 that allows for the target 405 to be differentiated from an object within the geographical area 518. In some embodiments, the threshold is a dynamic threshold. In other embodiments, the threshold is a static threshold (a preset threshold).

In other words, the electronic processor 200 predicts whether the discrimination factor will exceed the threshold based on a development status of one or more identifiers. For example, the electronic processor 200 may predict whether the discrimination factor will exceed the threshold based on the development of an identifier for the target 405, one or more identifiers for an object within the geographical area 518, or a combination thereof. Accordingly, in some embodiments, the discrimination factor exceeds the threshold when the development of an identifier for the target 405, an identifier for an object within the geographical area 518, or a combination thereof allows for the target 405 to be differentiated from an object within the geographical area 518, such as one or more of the bystanders 525.

In some embodiments, the electronic processor 200 predicts whether the discrimination factor will exceed the threshold based on an estimated development time. The estimated development time is an estimated time for developing one or more identifiers to a developmental status such that the discrimination factor between two or more of the identifiers will exceed the threshold. In such embodiments, the electronic processor 200 compares the estimated development time to an estimated arrival time for the pursuit asset 400 to reach the breaking junction 505. When the estimated development time is greater than the estimated arrival time, the electronic processor 200 predicts that the discrimination factor will not exceed the threshold. When the estimated development time is less than (or substantially equal to) the estimated arrival time, the electronic processor predicts that the discrimination factor will exceed the threshold.

The estimated development time may be based on a size of the geographical area 518. For example, a larger geographical area 518 will likely include a larger number of objects within the geographical area 518 than a smaller geographical area 518. Therefore, when the geographical area 518 is larger, the estimated development time may be longer than when the geographical area 518 is smaller. Alternatively or in addition, the estimated development time may be based on how populated the geographical area 518 is (for example, a bystander density level). For example, the more populated the geographical area 518 is, the longer the estimated development time may be. Accordingly, in some embodiments, the electronic processor 200 determines a bystander density level at the geographical area 518 (or at the intercept point 510) and predicts whether the discrimination factor will exceed the threshold based on the bystander density level.

Alternatively or in addition, the estimated development time may be based on an estimated time to develop a particular attribute for an identifier. A particular attribute may be more important in the development of an identifier, and, ultimately the development of the discrimination factor. It may take a longer period of time to collect sufficient imaging data relating to such an attribute. For example, facial attributes may be more important for the development of an identifier than attire attributes. Additionally, it may take longer to collect sufficient imaging data relating to a facial attributes than attire attributes. Accordingly, the electronic processor 200 may determine the estimated development time based on an importance of a particular attribute and an estimated development time for that particular attribute.

In some embodiments, the electronic processor 200 determines the estimated development time based on an initial discrimination factor screening. An initial discrimination factor screening is a determination of the discrimination factor at an early stage in the pursuit. The initial discrimination factor screening may indicate how significant of a difference there is between the first identifier for the target 405 and the second identifier for an object within the geographical area 518. When the difference is more significant, the estimated development time may be shorter than when the difference is less significant. For example, when there is not a significant difference between the first identifier for the target 405 and the second identifier for an object within the geographical area 518, the electronic processor 200 may determine a longer estimated development time. Similarly, when there is a significant difference between the first identifier for the target 405 and the second identifier for an object within the geographical area 518, the electronic processor 200 may determine a shorter estimated development time. For example, when the target 405 is an adult male and enters a crowd of female children, the estimated development time will be shorter as the target 405 will be easily differentiated from the crowd of female children.

When the electronic processor 200 predicts that the discrimination factor will exceed the threshold (at block 330), the electronic processor 200 notifies the pursuit asset 400 to break pursuit of the target 405 at the breaking junction 505 to execute the cornering route 500 (at block 335). The electronic processor 200 notifies the pursuit asset 400 by transmitting information to the pursuit asset communication device 120 associated with the pursuit asset 400. In some embodiments, the information transmitted to the pursuit asset communication device 120 includes one or more instructions. For example, the electronic processor 200 may send an instruction to the pursuit asset 400 (through the pursuit asset communication device 120) instructing the pursuit asset 400 to break pursuit of the target 405 at the breaking junction 505 to follow the cornering route 500. In some embodiments, the instructions are turn-by-turn directions for following the cornering route 500 (for example, directions to the intercept point 510).

The electronic processor 200 may transmit additional information to the pursuit asset communication device 120. In some embodiments, the electronic processor 200 transmits the additional information to the pursuit asset communication device 120 when notifying the pursuit asset 400 when to break pursuit of the target 405 (at block 335). Alternatively or in addition, the electronic processor 200 transmits the additional information to the pursuit asset communication device 120 continuously. For example, as additional information becomes available, the electronic processor 200 may automatically provide the additional information to the pursuit asset communication device 120.

The additional information transmitted to the pursuit asset communication device 120 may be associated with one or more additional pursuit assets. For example, the additional information may include an estimated arrival time of an additional pursuit asset, identifying information of an additional pursuit asset, a number of additional pursuit assets involved in the pursuit, an operational status of an additional pursuit asset, and the like. Alternatively or in addition, the additional information transmitted to the pursuit asset communication device 120 may be associated with the target 405. For example, the additional information may include an identification of the target 405, a reason for pursuit of the target 405, a criminal history of the target 405, other known information about the target 405, and the like. Alternatively or in addition, the additional information transmitted to the pursuit asset communication device 120 may be a continuous update on the developmental progress of the discrimination factor as the pursuit progresses.

When the electronic processor 200 predicts that the discrimination factor will not exceed the threshold (at block 330), the electronic processor 200 determines a next breaking junction and predicts whether the discrimination factor will exceed the threshold when the pursuit asset 400 reaches the next breaking junction. As noted above, the discrimination factor may be strengthened by allowing additional pursuit time. Therefore, depending on the strength of a discrimination factor, breaking pursuit at a later breaking junction (for example, a next breaking junction) may be advantageous over breaking pursuit at an earlier breaking junction (for example, the breaking junction 505). In other words, when the electronic processor 200 determines that the target 405 will not be securely tagged as against an object within the geographical area 518, the electronic processor 200 may discard the previous decision to break pursuit of the target 405 at the breaking junction 505 and begins the method 300 again at, for example, block 310 based on a next breaking junction.

Figure 9:
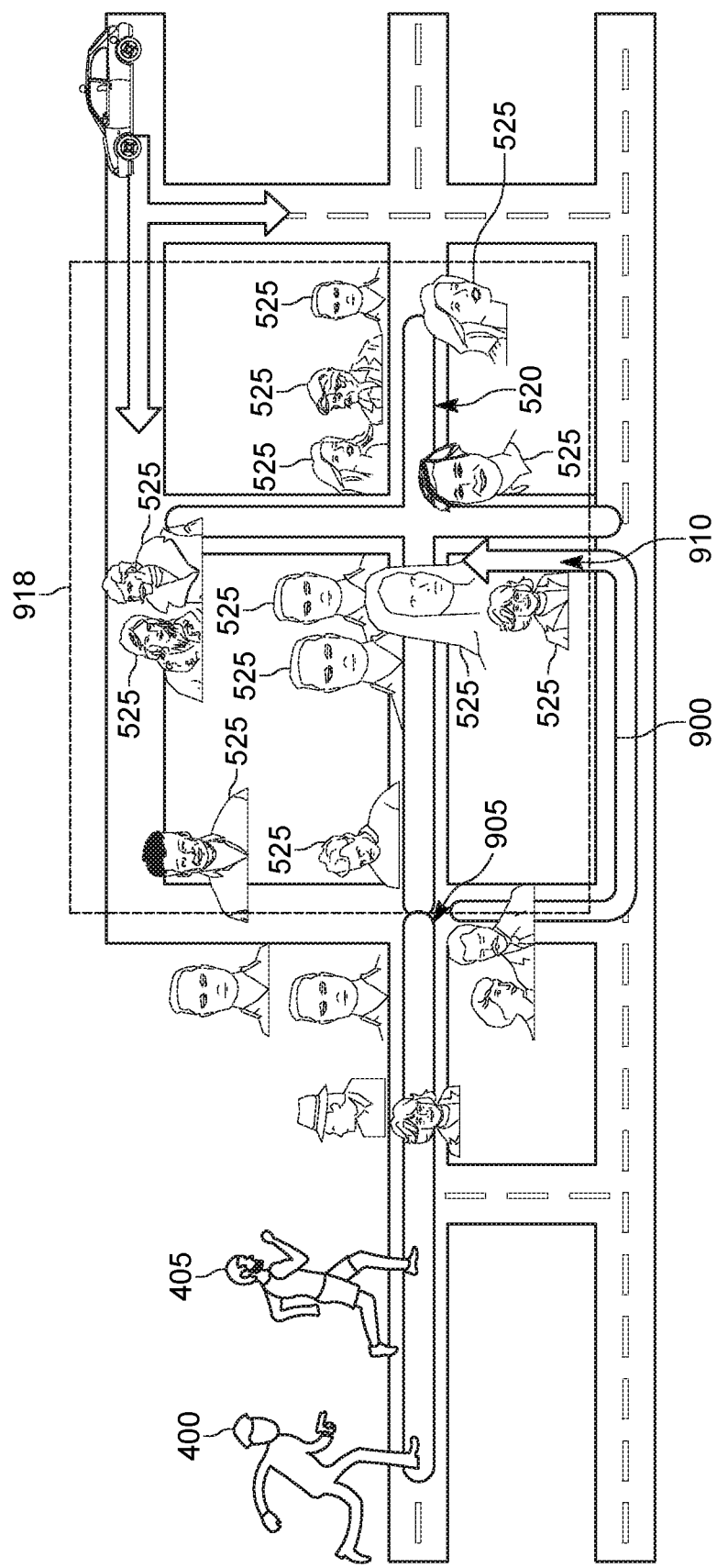
FIG. 9 illustrates an updated cornering route according to some embodiments.

For example, FIG. 9 illustrates an updated cornering route 900 including a next breaking junction 905 and a next intercept point 910. In the example illustrated, the electronic processor 200 determines an updated geographical area 918 associated with at least one possible target flee route 520 for the target 405 based on a cornering time for the updated cornering route 900. Based on the updated geographical area 918, the electronic processor 200 develops identifiers for one or more objects within the updated geographical area 918. The electronic processor 200 then develops a discrimination factor representing a degree of differentiation between the first identifier for the target 405 and the identifiers for the one or more objects within the updated geographical area 918. Based on the development of the discrimination factor, the electronic processor 200 predicts whether the development factor will exceed the threshold when the pursuit asset 400 arrives at the next breaking junction 905. When the electronic processor 200 predicts that the discrimination factor will exceed the threshold, the electronic processor 200 notifies the pursuit asset 400 to break pursuit of the target 405 at the next breaking junction 905 to follow the updated cornering route 900. When the electronic processor 200 predicts that the discrimination factor will not exceed the threshold, the electronic processor 200 determines yet another next breaking junction and beings the method 300 again.

In some embodiments, the electronic processor 200 develops an identifier (for example, a third identifier) for the pursuit asset 400 (for example, a covert police asset performing a covert or tailgating task). In such embodiments, the electronic processor 200 develops a discrimination factor (for example, a second identifier) representing a degree of differentiation of the identifier for the pursuit asset 400 with an identifier of an object within the geographical area 518. The electronic processor 200 also determines whether the discrimination factor exceeds a threshold. In such embodiments, the discrimination factor exceeds the threshold when the pursuit asset 400 is visible and identifiable by the target 405. For example, the discrimination factor may exceed the threshold when the pursuit asset 400 is an adult male wearing a blue shirt and is entering a geographical area 518 that is a park with only female children wearing a red school uniform. When the discrimination factor exceeds the threshold, the electronic processor 200 notifies the pursuit asset 400 to break pursuit of the target 405 at the breaking junction 505 to follow the cornering route 500. Alternatively or in addition, the electronic processor 200 notifies the pursuit asset 400 to break pursuit of the target 405 to follow an alternative cornering route that will help the pursuit asset 400 not be visible or be less visible to the target 405. Accordingly, the pursuit asset 400 may still pursue the target 405 through an alternative cornering route that allows the pursuit asset 400 to be less visible to the target 405 as opposed to the cornering route 500 where the pursuit asset 400 is more visible to the target 405 (such that the target 405 may not be aware that the pursuit asset 400 is following or tailgating the target 405).

In some embodiments, the electronic processor 200 identifies a hiding location within the geographical area 518 based on the discrimination factor. The hiding location may include a potential hiding location or a bad hiding location. As noted above, in some embodiments, the discrimination factor is based on a differentiation comparison between an identifier of the target 405 and an identifier of an object within the geographical area 518. Alternatively or in addition, in some embodiments, the discrimination factor is based on a differentiation comparison between an identifier of the pursuit asset 400 (or one or more identifiers of additional pursuit assets) with an identifier of an object within the geographical area 518.

A potential hiding location is a location (an object) within the geographical area 518 where the target 405, the pursuit asset 400, an additional pursuit asset (for example, a covert pursuit asset), or a combination thereof cannot be confidently distinguished from one or more objects. In other words, a potential hiding location is a location within the geographical area 518 where the target 405, the pursuit asset 400, or the additional pursuit asset blends in with the environment or surroundings. For example, where the identifier of the target 405 indicates that the target 405 is a blonde male wearing all black, the electronic processor 200 may identify a crowd of people wearing all black as a potential hiding location for the target 405. As another example, where an identifier for a covert pursuit asset indicates that the covert pursuit asset is wearing all black, the electronic processor 200 may identify a dark alleyway as a potential hiding location for the covert pursuit asset.

A bad hiding location is a location (an object) within the geographical area 518 where the target 405, the pursuit asset 400, an additional pursuit asset, or a combination thereof is confidently distinguished from one or more objects. In other words, a bad hiding location is a location within the geographical area 518 where the target 405, the pursuit asset 400, or the additional pursuit asset do not blend in with the environment or surroundings.

The electronic processor 200 may transmit information relating to a hiding location to the pursuit asset 400, an additional pursuit asset, or a combination thereof (through the pursuit asset communication device 120). The electronic processor 200 may transmit the information as one or more instructions (for example, a first instruction, a second instruction, and the like). The instructions may be directions that navigate the target 405, the pursuit asset 400, an additional pursuit asset, or a combination thereof to or from the hiding location. For example, where the electronic processor 200 identifies a potential hiding location for the target 405, the electronic processor 200 may transmit an instruction to the pursuit asset 400 instructing the pursuit asset 400 to route the target 405 away from the potential hiding location. As another example, where the electronic processor 200 identifies a potential hiding location for the pursuit asset 400, the electronic processor 200 may transmit an instruction to the pursuit asset 400 instructing the pursuit asset 400 to the potential hiding location. As yet another example, where the electronic processor 200 identifies a potential hiding location for an additional pursuit asset (for example, a covert pursuit asset), the electronic processor 200 may transmit an instruction to the covert pursuit asset instructing the covert pursuit asset to the potential hiding location. As yet another example, where the electronic processor 200 identifies a bad hiding location for the target 405, the electronic processor 200 may transmit an instruction to the pursuit asset 400 instructing the pursuit asset 400 to route the target 405 to the bad hiding location. As yet another example, where the electronic processor 200 identifies a bad hiding location for the pursuit asset 400 (for example, a covert police asset), the electronic processor 200 may transmit an instruction to the pursuit asset 400 instructing the pursuit asset 400 to avoid the bad hiding location.

Alternatively or in addition, in some embodiments, the electronic processor 200 uses the discrimination factor to determine when the target 405 is approaching (or entering) an invisible location. An invisible location is a location where the target 405 cannot be differentiate from an object within the geographical area 518. When the electronic processor 200 determines that the target 405 is approaching an invisible location, the electronic processor 200 may trigger an escalation. The electronic processor 200 may trigger the escalation by transmitting instructions to additional pursuit assets instructing the additional pursuit assets to join the pursuit. For example, the electronic processor 200 may transmit dispatch instructions for additional pursuit resources, such as a canine unit, a faster pursuit asset vehicle, and the like. Alternatively or in addition, the electronic processor 200 may trigger the escalation by transmitting instructions to the pursuit asset 400 with escalation instructions. For example, the escalation instructions may instruct the pursuit asset 400 to use a Taser on the target 405, use a police siren, make a loudspeaker warning to the target 405, and the like.

In some cases, a covert pursuit asset may follow the target 405 along a possible target flee route 520 while the pursuit asset 400 follows the cornering route 500. In such cases, the electronic processor 200 may develop a discrimination factor representing a degree of differentiation between an identifier of the covert pursuit asset and one or more identifiers for various locations or areas along the possible target flee route 520. Based on the discrimination factor for each location along the possible target flee route 520, the electronic processor 200 may transmit information to the covert pursuit asset. The information may identify locations along the possible target flee route 520 where the covert pursuit asset is more or less visible. Alternatively or in addition, the information may be an instruction for the covert pursuit asset to be more conspicuous. For example, the instruction may instruct the covert pursuit asset to turn his/her head lower, turn his/her head to a side, put a hat lower on his/her head, hide behind another person, put on a jacket of a particular color that is similar to the one worn by a bystander, avoid a line-of-sight with the target 405, and the like.

In some embodiments, the electronic processor 200 continuously transmits an indication of the discrimination factor to the covert pursuit asset (or another pursuit asset). The indication may include a user-interface bar indication, a numerical value indication, a percentage value indication, a warning level indication, and the like. In some embodiments, the indication of the discrimination factor indicates how well the covert pursuit asset (or another pursuit asset) is blending into his/her environment. Alternatively or in addition, the electronic processor 200 may provide a warning to the covert pursuit asset (or another pursuit asset) when the discrimination factor decreases (for example, when a crowd moves away, a light intensity increases, and the like).

Although the target 405 is generally described and illustrated herein as a person fleeing the pursuit asset 400 on foot, the target 405 may be driving a vehicle. In such embodiments, the electronic processor 200 develops the first identifier by extracting attributes associated with the target 405, attributes associated with a vehicle of the target 405, or a combination thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication system for pursuing a target, the system comprising:
an electronic processor configured to
develop a first identifier for the target,
determine a breaking junction and an intercept point associated with a cornering route,
determine a geographical area associated with at least one possible target flee route for the target based on a cornering time for a pursuit asset to arrive at the intercept point,
determine a second identifier for an object within the geographical area,
develop a discrimination factor representing a degree of differentiation of the first identifier from the second identifier,
predict whether the discrimination factor will exceed a threshold when the pursuit asset arrives at the breaking junction, wherein the discrimination factor exceeds the threshold when the development of the first identifier allows the target to be differentiated from the object within the geographical area, and
in response to the discrimination factor exceeding the threshold, notify the pursuit asset to break pursuit of the target at the breaking junction to execute the cornering route.

2. The communication system of claim 1, wherein the electronic processor is configured to develop the first identifier by extracting a plurality of attributes associated with the target from a video.

3. The communication system of claim 2, wherein the electronic processor is configured to continuously extract the plurality of attributes while the pursuit asset pursues the target.

4. The communication system of claim 2, wherein the electronic processor is configured to apply a weight to each of the plurality of attributes based on a comparison of the cornering time to an alteration time associated with each of the plurality of attributes.

5. The communication system of claim 2, wherein the electronic processor is configured to identify a first attribute included in the plurality of attributes that cannot be altered within the cornering time and a second attribute included in the plurality of attributes that can be altered within the cornering time, wherein the electronic processor is configured to develop the discrimination factor based on the first attribute and not the second attribute.

6. The system of claim 5, wherein the first attribute includes at least one selected from a group consisting of a weight of the target, a height of the target, a gender of the target, an age range of the target, a facial feature of the target, and a skin tone of the target.

7. The communication system of claim 1, wherein the electronic processor is configured to develop the discrimination factor by comparing a plurality of attributes associated with the target and a plurality of attributes associated with the object within the geographical area.

8. The communication system of claim 1, wherein the electronic processor is configured to determine the breaking junction and the intercept point based on a route associated with an additional pursuit asset.

9. The communication system of claim 1, wherein the electronic processor is configured to, in response to the discrimination factor not exceeding the threshold, determine a next breaking junction; and
predict whether the discrimination factor will exceed the threshold when the pursuit asset arrives at the next breaking junction.

10. The communication system of claim 1, wherein the electronic processor is configured to
determine a bystander density level at the geographical area, wherein the bystander density level represents a number of bystanders at the geographical area, and
predict whether the discrimination factor will exceed the threshold based on the bystander density level.

11. The communication system of claim 1, wherein the electronic processor is configured to develop the discrimination factor based on additional information associated with the cornering route, wherein the additional information includes at least one selected from a group consisting of a light intensity at the geographical area, a building type located at the geographical area, a time of day, a time of year, and a weather condition.

12. The communication system of claim 1, wherein the object is a bystander within the geographical area.

13. The communication system of claim 1, wherein the electronic processor is configured to
develop a third identifier for the pursuit asset,
develop a second discrimination factor representing a degree of differentiation of the third identifier and the second identifier, and
identify a potential hiding location within the geographical area based on the second discrimination factor.

14. The communication system of claim 13, wherein the electronic processor is configured to transmit at least one selected from a group consisting of a first instruction to the pursuit asset instructing the pursuit asset to route the target away from the potential hiding location and a second instruction to a covert pursuit asset instructing the covert pursuit asset to the potential hiding location.

15. A method for pursuing a target, the method comprising:
developing, with an electronic processor, a first identifier for the target;
determining, with the electronic processor, a breaking junction and an intercept point associated with a cornering route;
determining, with the electronic processor, a geographical area associated with at least one possible target flee route for the target based on a cornering time for a pursuit asset to arrive at the intercept point;
determining, with the electronic processor, a second identifier for an object within the geographical area;
developing, with the electronic processor, a discrimination factor representing a degree of differentiation of the first identifier from the second identifier;
predicting, with the electronic processor, whether the discrimination factor will exceed a threshold when the pursuit asset arrives at the breaking junction, wherein the discrimination factor exceeds the threshold when the development of the first identifier allows the target to be differentiated from the object within the geographical area; and
in response to the discrimination factor exceeding the threshold, notifying, with the electronic processor, the pursuit asset to break pursuit of the target at the breaking junction to execute the cornering route.

16. The method of claim 15, further comprising:
in response to the discrimination factor not exceeding the threshold, determining a next breaking junction; and
predicting whether the discrimination factor will exceed the threshold when the pursuit asset arrives at the next breaking junction.

17. The method of claim 15, further comprising:
determining a bystander density level at the geographical area, the bystander density level representing a number of bystanders at the geographical area, wherein predicting whether the discrimination factor will exceed the threshold includes predicting whether the discrimination factor will exceed the threshold based on the bystander density level.

18. The method of claim 15, wherein developing the discrimination factor includes developing the discrimination factor based on additional information associated with the cornering route, wherein the additional information includes at least one selected from a group consisting of a light intensity at the geographical area, a building type located at the geographical area, a time of day, a time of year, and a weather condition.

19. The method of claim 15, further comprising:
identifying a potential hiding location within the geographical area based on the discrimination factor.

20. The method of claim 19, further comprising:
transmit at least one selected from a group consisting of a first instruction to the pursuit asset instructing the pursuit asset to route the target away from the potential hiding location and a second instruction to a covert pursuit asset instructing the covert pursuit asset to the potential hiding location.

* * * * *